United States Patent [19]

Biss

[11] Patent Number: 5,233,786
[45] Date of Patent: Aug. 10, 1993

[54] FLEXIBLE FISHING SINKER

[76] Inventor: Francis D. Biss, P.O. Box 51, Raymond, Wash. 98577

[21] Appl. No.: 847,380

[22] Filed: Mar. 6, 1992

[51] Int. Cl.$^5$ .............................................. A01K 95/00
[52] U.S. Cl. ..................................... 43/43.12; 43/43.14
[58] Field of Search ............... 43/42.52, 43.12, 42.08, 43/42.39, 43.14, 44.87, 43.1, 44.92

[56] References Cited

U.S. PATENT DOCUMENTS

| | | | |
|---|---|---|---|
| 3,318,037 | 5/1967 | Harrison | 43/43.14 |
| 3,648,398 | 4/1972 | Newell | 43/43.12 |
| 3,852,907 | 12/1974 | Haught | 43/44.9 |
| 4,389,805 | 6/1983 | Hargrave | 43/43.14 |
| 4,450,646 | 5/1984 | Maltese | 43/43.14 |
| 4,753,030 | 6/1988 | Ziglinski | 43/43.12 |
| 4,819,364 | 4/1989 | Lill | 43/43.1 |
| 4,944,107 | 7/1990 | Wymore | 43/44.89 |
| 5,129,178 | 7/1992 | Hicks | 43/44.92 |

FOREIGN PATENT DOCUMENTS

| | | | |
|---|---|---|---|
| 0094933 | 9/1959 | Netherlands | 43/42.24 |
| 2207841 | 2/1989 | United Kingdom | 43/44.81 |

OTHER PUBLICATIONS

Cabelas, 1992 Spring Catalog, Non-Toxic Sinkers, p. 74.
Fly Fishing Quarterly, 1992 Spring Issue Gary La-Fontaine, p. 50, The Slinky Rig for Steelhead And Trout.

Primary Examiner—Richard K. Seidel
Assistant Examiner—Jeanne M. Elpel

[57] ABSTRACT

A fishing sinker device comprised of an eye pierced through a reinforced tang that is shaped out of a cap and tubular jacket made of heat shrink tubing which is integrally formed to a flexible annulated body containing a number of nontoxic steel or other metal shot. In addition to a flexible annulated body which is spherically segmented by a series of annular indentations which may be quickly cut as with a knife to alter the original weight of the sinker.

6 Claims, 1 Drawing Sheet

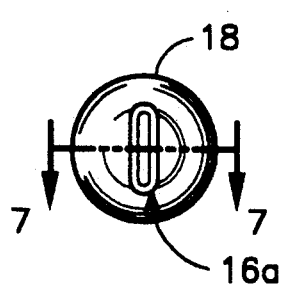
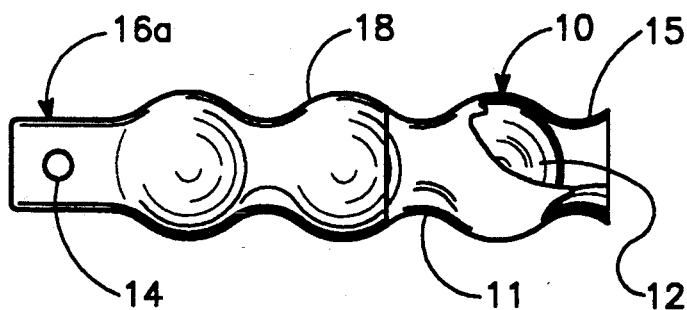
Fig. 1  Fig. 2
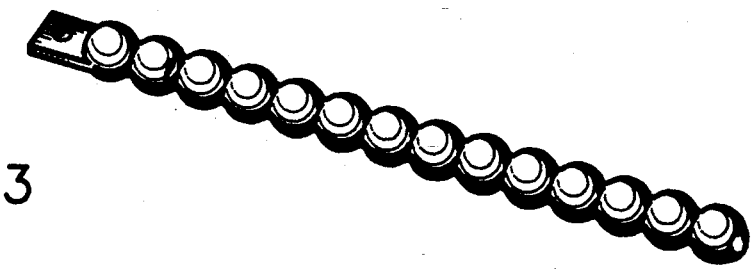
Fig. 3
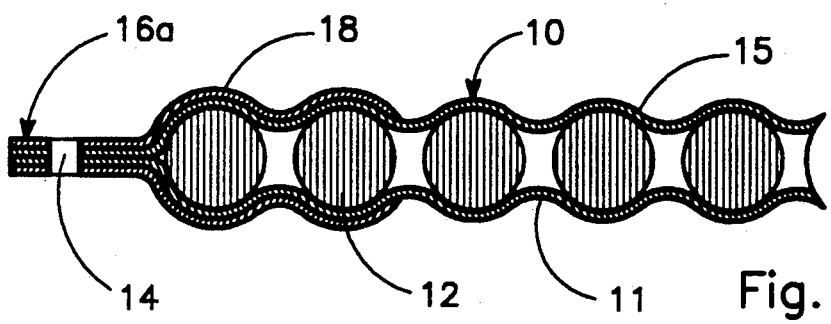
Fig. 4
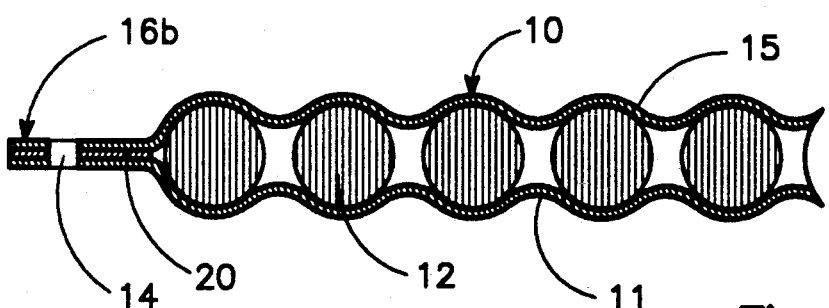
Fig. 5
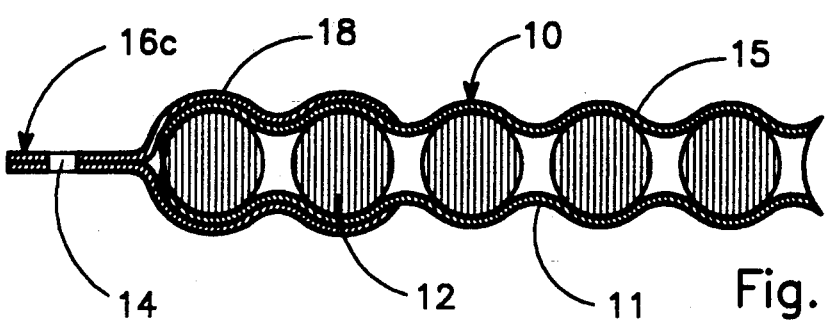
Fig. 6

FLEXIBLE FISHING SINKER

BACKGROUND

1. Field of Invention

This invention relates to the sport of fishing and the use of a weight as a means for sinking a hook and line below the surface of the water.

2. Description of Prior Art

Fishing sinkers have generally been made out of lead. However, by throwing lead sinkers into the life-sustaining waters of different oceans, lakes, rivers, and streams, fishermen have been slowly polluting the environment. Lead is a toxic substance and when a lead sinker is lost, it becomes just another environmental problem. Therefore, in the interest of protecting the environment, if more sinkers could be made out of some nontoxic substance, lost sinkers would then be less of an environmental concern.

Furthermore, due to the varying water conditions that are usually encountered by fishermen, along with their apparent need to change to different types of baits, lures, and other forms of tackle, an adjustable weight sinker that could be quickly altered in weight to fit a given fishing situation would prove useful in reducing the likelihood of an overweighted sinker snagging on various underwater objects such as rocks and sunken debris. Thus, an adjustable weight sinker would provide the fisherman with an additional means of conserving valuable fishing tackle and time.

Typically, fishing sinkers have been labeled as being nontoxic because they are not made out of lead. Many of these sinkers are constructed out of some form of alloy of zinc and are molded into short, compact shapes such as found in bullet, ball, or bass casting sinkers. Zinc (Zn), cadmium (Cd), copper (Cu), nickel (Ni), and lead (Pb) are all considered to be heavy metals known to be toxic to fish and other aquatic organisms. These short, compact sinkers of zinc usually come in a standard size such as ½ oz., ¾ oz., 1 oz., etc., and simply do not allow for any further adjustments to be made in the original sinker's weight.

OBJECTS AND ADVANTAGES

The object and advantage of this invention is to provide an elongated, flexible sinker for sports fishermen which is nontoxic to the aquatic environment and is constructed with an additional feature that allows its original weight to be changed.

Further, objects and advantages of this invention will become apparent from a consideration of the drawings and ensuing descriptions of it.

DRAWING FIGURES

FIG. 1 shows an end view of the preferred embodiment of the flexible fishing sinker invention.

FIG. 2 is a side view of FIG. 1.

FIG. 3 is a perspective view of the sinker of FIG. 1.

FIG. 4 is a sectional view along the line 7—7 of FIG. 1, showing a sinker with an outer reinforced tang or cap.

FIG. 5 is a sectional view of a modified sinker along the line 7—7 of FIG. 1, showing a sinker with an inner reinforced tang or insert.

FIG. 6 is a sectional view of a modified sinker along the line 7—7 of FIG. 1, showing a sinker with a non-reinforced tang.

DESCRIPTION OF INVENTION

FIGS. 1, 2, and 4 show the preferred embodiment of the sinker invention. The sinker is comprised of a flexible annulated body 10 which is spherically segmented by a series of annular indentations 11. The flexible annulated body 10 is formed out of a tubular jacket 15 which covers a number of steel or other metal shot 12. A reinforced tang 16a is added to the flexible annulated body 10 which is flattened and shaped out of an attached cap 18 and a small section of the tubular jacket 15. An eye 14 is then pierced into the tang 16a.

FIG. 3 shows the preferred embodiment of the fishing sinker in a length of not less than three times its width.

FIG. 5 shows a modified sinker comprised of a flexible annulated body 10 formed from a tubular jacket 15 covering a number of steel or other metal shot 12 that are segmented by a series of annular indentations 11. An eye 14 is pierced through a reinforced tang 16b which is shaped out of an attached insert 20 and a small section of tubular jacket 15.

FIG. 6 shows a modified sinker comprised of a flexible annulated body 10 which is spherically segmented by a series of annular indentations 11. The flexible annulated body 10 is formed out of a tubular jacket 15 which covers a number of steel or other metal shot 12. An eye 14 is pierced through a non-reinforced tang 16c shaped out of a cap 18 is integrally formed over preferably at least two of the jacketed metal shot.

The preferred choice of material used in the shaping and forming of tubular jackets, caps, and inserts for sinkers with approximately up to a 5/16 inch diameter metal shot is Polyolefin MIL-I-23053/5 Class 1, heat shrink tubing.

The preferred choice of steel shot is a composition of iron (Fe) and other various elements that contain less than one percent of certain heavy metals such as zinc (Zn), cadmium (Cd), copper (Cu), nickel (Ni), and lead (Pb).

OPERATION OF THE INVENTION

The fishing sinker is connected to a fishing line by its eye 14. The flexible annulated body 10 is spherically segmented by a series of annular indentations 11 which may then be quickly cut with a knife to alter the weight of the sinker. By altering the weight of the original sinker, fishermen may be able to compensate for changing water conditions and for the possible use of different types of baits, lures, and tackle. In addition to forming part of the flexible annulated body 10, the tubular jacket 15 helps to prevent any possible corrosion in the steel or other metal shot 12. The use of steel shot in the construction of the sinker is to provide for a nontoxic alternative to the use of lead.

I claim:

1. A fishing sinker comprising;
   a plurality of metal shot,
   a reinforcement attachment,
   and a length of heat shrunk plastic tubing having a tubular jacket portion and a tang portion formed at one end, said tang portion being a flattened portion of tubing,
   said reinforcement attachment affixed to said tang portion, and the reinforcement attachment and the tang portion having an eye extending therethrough, said tubular jacket portion conforming to said plurality of metal shot to form annular indentations between the metal shot, wherein said tubular jacket portion can be severed at said annular indentations without releasing the metal shot from the tubular jacket portion.

2. The fishing sinker of claim 1 wherein the reinforcement attachment is an insert which is inserted in said flattened portion of tubing.

3. The fishing sinker of claim 1 wherein the reinforcement attachment is a cap, said cap conforming to at least one metal shot and said tang portion, said cap and said tang portion having an eye therethrough.

4. The fishing sinker of claim 1 wherein said tubular jacket portion is flexible.

5. A fishing sinker comprising;
a plurality of metal shot,
a length of heat shrunk plastic tubing comprising a tubular jacket portion, said tubular jacket portion conforming to said plurality of metal shot to form annular indentations between said metal shot, wherein said tubular jacket portion can be severed at said annular indentations without releasing the metal shot,
a cap attached to one end of said tubular jacket, said cap conforming to at least one metal shot and having a tang portion extending therefrom, said tang having an eye therethrough.

6. The fishing sinker of claim 5 wherein said tubular jacket portion is flexible.

* * * * *